March 13, 1962  I. M. MARTIN  3,025,109
WHEEL ADAPTER

Filed Jan. 27, 1959

INVENTOR.
ISAAC M. MARTIN
BY
HIS ATTORNEY

March 13, 1962  I. M. MARTIN  3,025,109
WHEEL ADAPTER

Filed Jan. 27, 1959

INVENTOR.
ISAAC M. MARTIN
BY Edward Redden
HIS ATTORNEY

March 13, 1962

I. M. MARTIN 3,025,109

WHEEL ADAPTER

Filed Jan. 27, 1959

INVENTOR.
ISAAC M. MARTIN
BY *Edward P. Redden*
HIS ATTORNEY

United States Patent Office 3,025,109
Patented Mar. 13, 1962

3,025,109
WHEEL ADAPTER
Isaac M. Martin, 215 San Marco Drive,
Long Beach, Calif.
Filed Jan. 27, 1959, Ser. No. 789,312
4 Claims. (Cl. 301—9)

This invention relates to the mounting of tire wheels on vehicles and particularly to a wheel adapter useful for mounting a wheel having one type of mounting holes onto the hub of a motor vehicle or trailer having mounting holes of different dimensions or numbers.

In the past it has been necessary to carry a separate spare tire for each of various types of hubs being driven or pulled by a motorist. For example, a motorist driving an automobile and pulling a trailer usually had to carry with him a spare tire for the automobile and a spare tire for the trailer wheels. Very rarely would the automobile wheels and the trailer wheels have the same number or dimensions of hub holes for mounting the wheel. In practice the motorist usually merely carried a spare tire and wheel for his automobile and trusted to luck as far as the trailer wheels were concerned. If he acquired a flat tire on his trailer, he usually had to take the wheel off the trailer, leave his trailer, and travel to the nearest service station to have the flat tire fixed. Meanwhile his trailer was left to the danger of damage or loss through theft or vandalism.

There have been wheel adapters invented in the past, but these usually have been of only very temporary utility or have been merely useful to adapt one particular type of wheel to a second particular type of hub. For example, wheel adapters have been invented which utilize a slotted arrangement to handle screw holes of varying radii from the center of the hub and also specially designed wide slots to permit mounting on either a five screw hub or a six screw hub. Also an adapter has been invented in the past which has holes in a given number and radii from the center and screws protruding in a different number and radii. Both of these configurations have proved very unsatisfactory. In the first example, a specially designed wheel must be made and purchased having the slotted arrangement already incorporated. It has no utility in presently existing wheels. Further, the slotted arrangement is unsatisfactory in that the nuts tend to slip or bear unevenly on the wheel, resulting in misalignment and unbalancing of the wheel. In the second example, the design has utility for only two given combinations. Seldom does the owner of an automobile continue to use the same automobile with the same trailer for any length of time. The purchase of a new trailer or a new automobile would probably necessitate the purchase of a new adapter plate.

Trailer rental agencies have thus in the past been required to have on hand a large number of different adapter plates to supply the needs of the large number of different makes of automobiles which might be utilized by their customers to draw their trailers. In addition, supply houses which sell such adapters must stock and carry in supply a large number of different types of adapters to meet the particular combination of requirements of their customers.

It is therefore an object of this invention to provide an improved adapter for wheels which has a high degree of flexibility in matching different types of wheels to a large variety of hub screw hole configurations.

It is another object of this invention to provide an improved adapter for wheels which permits a wheel adapter supplier to maintain in stock only a small and limited number of different items to satisfy the needs of a customer having any of the possible combinations of requirements.

It is a further object of this invention to provide an improved wheel adapter which is easily adapted to mount wheels of various mounting hole diameters to many different hub bolt diameters.

Other objects of this invention will become apparent from the following description taken in conjunction with the accompanying drawings in which FIG. 1 is a view of a typical wheel mounted on a hub of a vehicle;

Present automobiles, trucks and trailers are provided with wheels which have holes designed to fit over screws on the wheel hub or to match up with screw holes on the wheel hub. There is, however, a great lack of uniformity in both the number of holes and screws in the wheel mounting system and in the diameters of the screw-hole circle. Many trailers and trucks have six mounting screws uniformly spaced around a circle of five and a half inches diameter. Many automobiles have five mounting holes or screws uniformly spaced around circles whose diameters are four and a half inches, four and three-quarters inches, five inches or five and a half inches. In order to couple a wheel to the hub it is necessary to align the wheel holes with the screws or screw holes or to provide some other means for conveying the torque from the hub to the wheel.

Figure 1:
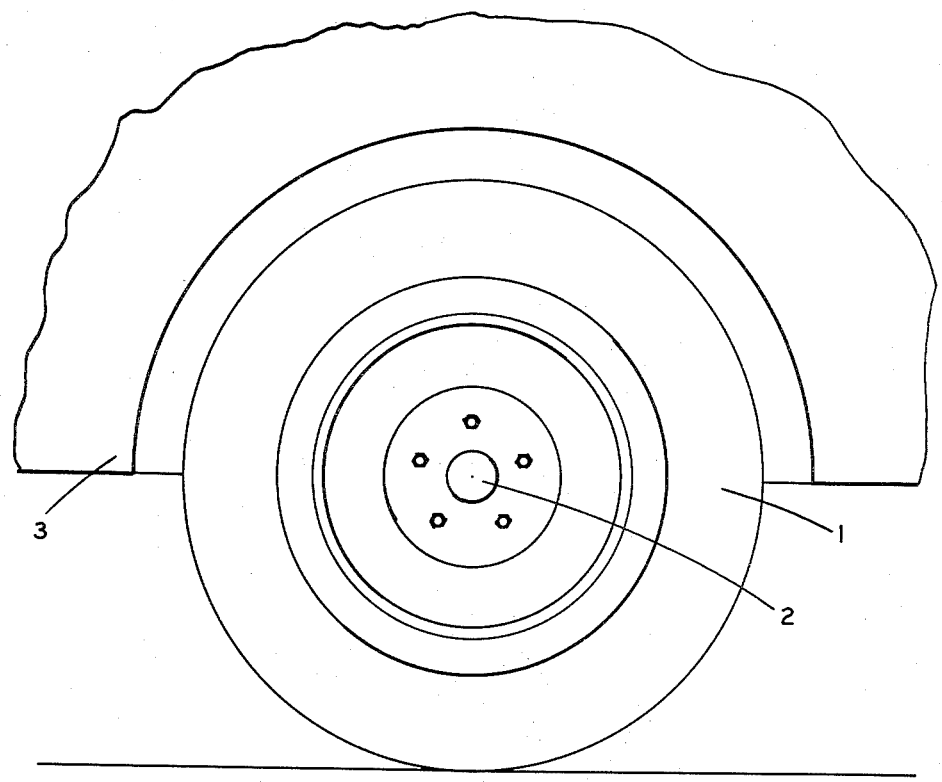
Figure 2:
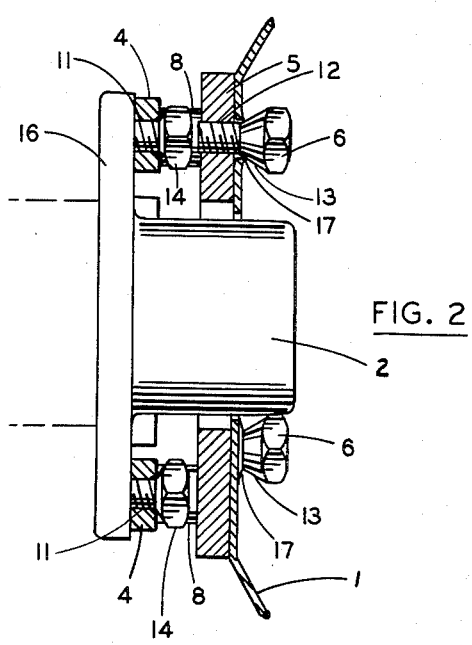
FIG. 2 is a partial section view of the wheel mounted on a hub utilizing the wheel adapter contemplated by this invention.

Referring now to FIGS. 1 and 2 there is shown a typical arrangement by which a wheel is mounted on a hub utilizing the wheel adapter of this invention. It is desired to mount wheel 1 on hub 2 of vehicle 3. It is assumed that the number of holes or the diameter of the holes in the wheel does not correspond with the number or the diameter of the screws or screw holes in the hub.

Referring now to FIG. 3, 4, 5 and 6 a preferred embodiment of the wheel adapter contemplated by this invention is shown. The adapter shown is utilized to mount a five hole wheel on a six screw hub. The adapter utilizes six off-set lugs 4, a mounting plate 5 and five plate screws 6. Lug 4 is shown in section view in FIG. 6. Lug 4 is provided with mounting hole 7 surrounded by a cylindrical wall 8 at one end of which is provided shoulder 9. Hole 7 is tapped to receive lug screw 10. Off-set from hole 7 in lug 4 is another hole 11 which is large enough to fit loosely over the mounting screws (not shown) of the hub. Holes 11 are provided with taper 15 at one end which cooperates with a taper on hub screws 14 to aid in centering the hub mounting screws in holes 11. Lug screws 10 secure lugs 4 to plate 5 with holes 11 equispaced around a circle having a diameter equal to the diameter of the screws on the hub.

Mounting plate 5 is also provided with five equispaced tapped holes 12 having centers on a circle having a diameter equal to the diameter of the holes in the wheel to be mounted. These holes 12 are adapted to receive plate screws 6. Plate screws 6 preferably have the same diameter as the studs on the hub and are preferably provided with a tapered section 13 adjacent to the screw head to assist in properly aligning the wheel.

In operation the wheel adapter is utilized to mount the wheel on the hub as follows: First, the six lugs 4 are placed over and aligned with the screw holes on hub 2, utilizing holes 11 of lugs 4. Then hub screws 14 are inserted into holes 11 and the holes on the hub and tightened in place to thereby hold lugs 4 securely against the hub base 16, first making certain that holes 7 of lugs 4 are substantially aligned in the manner shown in FIG. 3. Then mounting plate 5 is placed over lugs 4 utilizing shoulders 9 of walls 8. Lug screws 10 are then tightened into place to hold plate 5 firmly against shoulders 9 of lugs 4. Wheel 1 is now placed adjacent to plate 5 with the five holes of the wheel substantially aligned with the five holes 12 of the plate. Plate screws 6 are then inserted through holes 17 of wheel 1 and screwed into holes 12. After screws 6 have been tightened, the operation is completed.

Figure 3:
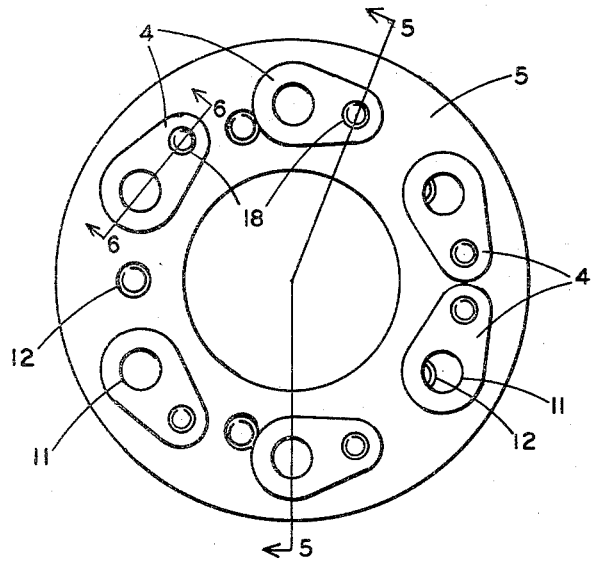
FIG. 3 is a plan view of a preferred embodiment of the wheel adapter contemplated by this invention.
Figure 5:
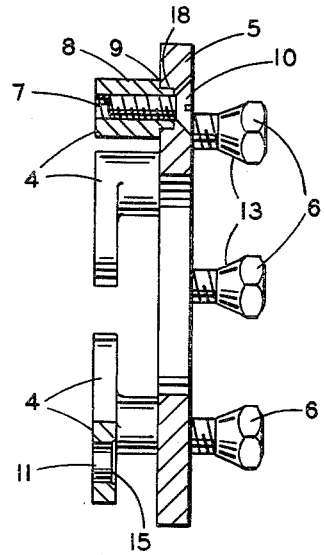
FIG. 5 is a section view of the wheel adapter of FIG. 3 taken along the lines 5—5.
Figure 4:
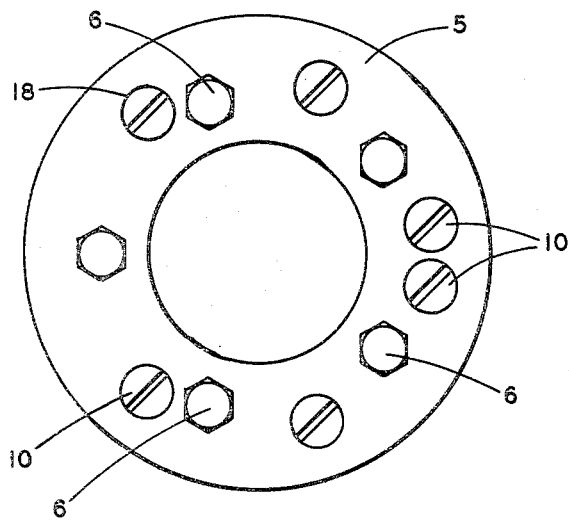
FIG. 4 is a back view of the wheel adapter of FIG. 3.
Figure 6:
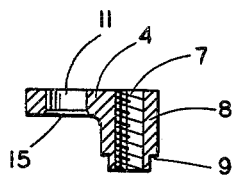
FIG. 6 is a section view of the adapter lug of FIG. 3 taken along the line 6—6.

It is to be noted that in order to provide for wheel holes of different diameters or for screws or screw holes of different diameters from the one shown in FIG. 3, it is only necessary to exchange plate 5 for a new plate having the properly drilled holes 12 and 18. Thus in stocking this wheel adapter, a supplier or user need only keep a minimum number of lugs 4 and screws 6 and 10, together with a few different plates 5 in order to be able to handle all possible combinations of wheel and hub mounting systems. It is to be further noted that the wheel is mounted adjacent to plate 5 thereby providing a large flat area as a bearing surface.

Figure 7:
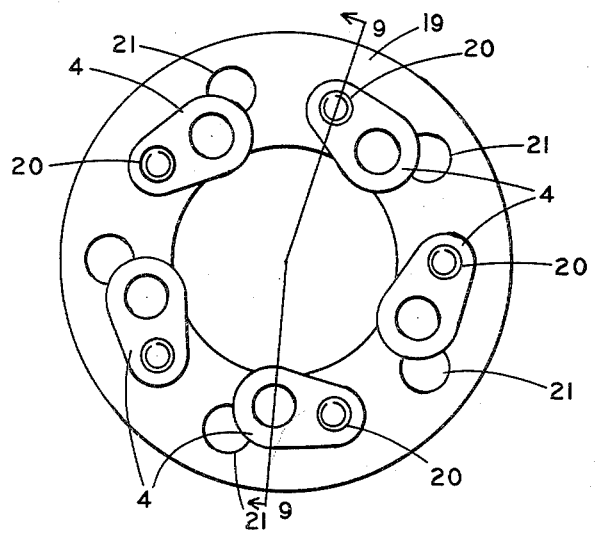
FIG. 7 is a plan view of an alternate embodiment of the wheel adapter contemplated by this invention.
Figure 9:
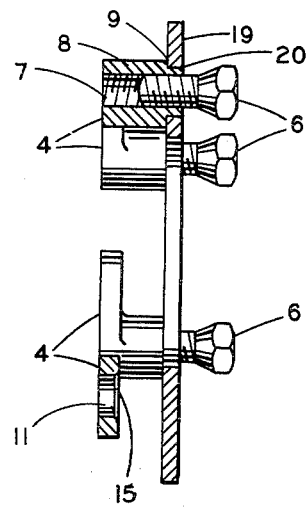
FIG. 9 is a section view of the wheel adapter of FIG. 7 taken along the lines 9—9.
Figure 8:
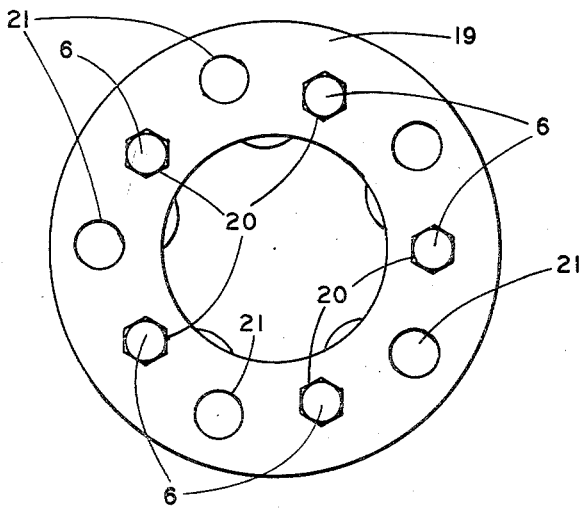
FIG. 8 is a back view of the wheel adapter of FIG. 7.

Referring now to FIGS. 7, 8 and 9 an alternate embodiment of the wheel adapter contemplated by this invention is shown. In this embodiment it is desired to mount a five hole wheel on a five screw hub with the diameter of the hole circle different from the diameter of the screw circle. In this embodiment lug 4 is identical to lug 4 of FIG. 6, except only five lugs are needed. Plate 19 is provided with five equispaced holes 20 whose centers are in a circle having a diameter equal to the diameter of the wheel hole circles. Holes 20 are preferably made large enough to fit snugly around wall 8 below shoulder 9. The size of tapped hole 7 is preferably the same as the size of the screws on the hub. Plate screws 6 are screwed into holes 7. On the same plate 19, other holes such as holes 21 may be drilled equispaced about a circle of a different diameter thereby permitting the same plate 19 to be used for two or more different wheel hole circle diameters.

In operation, the wheel adapter of FIGS. 7, 8 and 9 is used as follows: First, the lugs 4 are aligned with the screw holes of the hub in the same manner as previously described, with holes 11 aligned with the screw holes, and hub screws 14 are inserted therein and tightened on the lugs to hold them in place. In this case holes 7 of the five lugs are initially aligned with their centers substantially equispaced about a circle having a diameter equal to the wheel hole circle diameter. Plate 19 is then placed over lugs 4 and rested against shoulder 9 of lugs 4. Wheel 1 is now placed adjacent to plate 19 with the five holes of the wheel substantially aligned with the five holes 7 of the lugs. Plate screws 6 are then inserted through holes 17 of wheel 1 and screwed into holes 7. After plate screws 6 have been tightened, the operation is completed.

Lugs 4 are preferably constructed with the distance between the centers of holes 7 and 11 at least as great as the maximum difference in radii of the wheel hole circles. In that way one set of lugs 4 can be used for any possible combination of mismatched wheel and hubs.

It will be readily apparent that with a very few parts, anyone who wants to adapt hubs to match wheels can make all possible present combinations by using the wheel adapter of this invention. For example, in order to make the various combinations previously indicated as typical of 6 bolt-5½ inch circle and 5 bolt-4½, 4¾, 5 and 5½ inch circles, all the equipment needed are six lugs 4, six cap screws 6, four plates 5 and two plates 19. The amount of equipment can be further reduced by multiple drillings of holes on plates 5 in the manner shown with respect to holes 20 and 21 in plate 19. As a result retail outlets and trailer rental agencies no longer need to stock a large number of different dimension wheel adapters in order to satisfy the requirements of all possible users.

Although this invention has been described and illustrated in detail, the same is by way of illustration and example only and is not to be taken by way of limitation, the scope of this invention being limited only by the appended claims.

I claim:

1. A wheel adapter comprising a plurality of off-set lugs having a first hole sized to fit around the hub screws of the hub base and a second hole tapped to receive a plate screw and further having an extension wall surrounding said second hole for a predetermined distance, said first and second holes having substantially parallel axes, a predetermined distance apart; a flat plate having a large central cut-out sized to fit over the wheel hub; and a plurality of plate screws adapted to screw into said second hole of said off-set lugs.

2. A wheel adapter comprising a plurality of off-set lugs having a first hole and a second hole and a flat surface, said first and second holes having substantially parallel axes normal to said flat surface and spaced a predetermined distance apart, said first hole being of a size to fit loosely around the hub screws of the wheel hub and said second hole being tapped to receive a plate screw, the thickness of said lug along the axis of said first hole being a first predetermined distance and the thickness of said lug along the axis of said second hole being a second predetermined longer distance; a flat plate having a large central cut-out sized to fit over the wheel hub and a plurality of smaller holes equispaced about concentric circles around said large cut-out; and a plurality of plate screws adapted to screw into said second hole of said off-set lugs.

3. A wheel adapter comprising a relatively thin flat plate having a central opening to fit over a wheel hub provided with a plurality of circumferentially spaced screw holes disposed to permit the plate holes to be aligned with a plurality of circumferentially spaced wheel holes; a plurality of off-set lugs having a first hole and a second hole and a flat surface, said first and second holes having substantially parallel axes normal to said flat surface and spaced a predetermined distance apart, said first hole being of a size to fit over the hub screws of said wheel hub and said second hole being tapped to receive a wheel plate screw, the thickness of said lug along the axis of said first hole being a first predetermined distance and the thickness of said lug along the axis of said second hole being a second predetermined longer distance; and a plurality of plate screws adapted to screw into said second hole of said off-set lugs.

4. A wheel adapted for securely attaching a wheel having a plurality of holes equispaced about a first given circumference to a wheel hub having a second plurality of tapped holes equispaced about a second given circumference comprising a relatively thin flat plate having a plurality of tapped holes equispaced about a preselected circumference and having a central opening coaxial with said circumference and sized to fit over said wheel hub, the number, size and circumference of said holes in said plate being equivalent to the number, size and circumference of said holes in said wheel, said flat plate having a second plurality of holes equispaced about a preselected circumference, said second plurality of holes being sized to receive lug screws having countersunk heads; a plurality of off-set lugs having a first hole and a second hole and a flat surface, said first and second holes having substantially parallel axes normal to said flat surface and spaced a predetermined distance apart, said first hole being of a size to fit over a hub screw of the size to thread into said holes of said wheel hub and said second hole being tapped to receive a lug screw having a countersunk head of a size to fit into said second plurality of holes in said thin plate, the thickness of said lug along the axis of said first hole being a first predetermined distance and the thickness of said lug along the axis of said second hole being a second predetermined longer distance; a plurality of hub screws sized to screw into said tapped holes of said wheel hub; a second plurality of plate screws sized to screw into said plurality of tapped holes in said thin plate; and a plurality of lug screws having countersunk heads sized to screw into said second hole of said off-set lug.

References Cited in the file of this patent

UNITED STATES PATENTS

| | | |
|---|---|---|
| 1,134,257 | Chase | Apr. 6, 1915 |
| 2,570,559 | Juergenson | Oct. 9, 1951 |
| 2,779,630 | Klinker | Jan 29, 1957 |

FOREIGN PATENTS

| | | |
|---|---|---|
| 561,428 | France | Aug. 6, 1923 |